US012793486B2

United States Patent
(12) United States Patent
O'Reilly

(10) Patent No.: US 12,793,486 B2
(45) Date of Patent: Nov. 10, 2026

(54) LOCK BOX

(71) Applicant: Reward Tech Limited, Abingdon (GB)

(72) Inventor: Sarah O'Reilly, Abingdon (GB)

(73) Assignee: Twenty Two Innovations Holding Ltd, Didcot (GB)

( * ) Notice: Subject to any disclaimer, the term of this patent is extended or adjusted under 35 U.S.C. 154(b) by 0 days.

(21) Appl. No.: 18/707,425

(22) PCT Filed: Nov. 3, 2022

(86) PCT No.: PCT/GB2022/052776
§ 371 (c)(1),
(2) Date: May 3, 2024

(87) PCT Pub. No.: WO2023/079289
PCT Pub. Date: May 11, 2023

(65) Prior Publication Data
US 2025/0166438 A1 May 22, 2025

(30) Foreign Application Priority Data
Nov. 3, 2021 (GB) ..................................... 2115828

(51) Int. Cl.
*G07C 9/00* (2020.01)

(52) U.S. Cl.
CPC ................................ *G07C 9/00571* (2013.01)

(58) Field of Classification Search
CPC ................................................. G07C 9/00571
USPC ........................................................... 70/263
See application file for complete search history.

(56) References Cited

U.S. PATENT DOCUMENTS 4,808,993 A * 2/1989 Clark ....................... G07C 9/33 340/5.73
4,914,732 A * 4/1990 Henderson ......... G07C 9/00571 70/277
4,988,987 A * 1/1991 Barrett ............... G07C 9/00896 235/382.5
5,245,652 A * 9/1993 Larson ............... G07C 9/00896 235/382.5
5,602,536 A * 2/1997 Henderson ............... G07C 9/27 340/5.23
5,793,287 A * 8/1998 Anderson .......... G07C 9/00912 70/57.1
5,896,095 A * 4/1999 Hill .................... G07C 9/00658 340/5.2

(Continued)

FOREIGN PATENT DOCUMENTS

JP 2014-001567 A 1/2014
WO 2012/151280 A1 11/2012

(Continued)

OTHER PUBLICATIONS

Farm Pantry, Farm Pantry Vending Machines Automatic payment systems, Aug. 14, 2019, 16 pages. https://farmpantry.co.uk/assets/Farm_Pantry.pdf.

*Primary Examiner* — Nathan Cumar
(74) *Attorney, Agent, or Firm* — Hodgson Russ LLP

(57) ABSTRACT

There is described a lock box 1 comprising a cavity 2 for receiving an item; and a locking mechanism 3 for controlling access to the cavity 2: wherein the locking mechanism 3 is arranged to allow access to the cavity 2 in dependence on the meeting of a condition set by a controlling party.

20 Claims, 4 Drawing Sheets

(56) References Cited

U.S. PATENT DOCUMENTS

| | | | | |
|---|---|---|---|---|
| 6,057,779 | A * | 5/2000 | Bates | G07C 9/33 340/8.1 |
| 6,359,547 | B1 * | 3/2002 | Denison | B60R 25/102 340/663 |
| 6,822,553 | B1 * | 11/2004 | Henderson | G07C 9/27 70/278.1 |
| 7,973,431 | B2 * | 7/2011 | Feldmeier | D06F 39/14 307/328 |
| 9,169,671 | B1 * | 10/2015 | Collins | E05B 65/0075 |
| 9,552,564 | B1 * | 1/2017 | Martenis | G07C 9/00571 |
| 9,734,646 | B1 * | 8/2017 | Noell | G07C 9/00571 |
| 9,980,020 | B1 * | 5/2018 | Sharp | G07C 9/00174 |
| 2004/0108938 | A1 | 6/2004 | Entrekin | |
| 2014/0305352 | A1 * | 10/2014 | Dowling | G07F 9/009 109/38 |
| 2015/0091696 | A1 * | 4/2015 | Fisher | G07C 9/00571 340/5.61 |
| 2015/0240521 | A1 * | 8/2015 | Vaknin | E05C 1/08 292/144 |
| 2015/0332528 | A1 * | 11/2015 | McGinnis | E05G 1/00 109/23 |
| 2016/0047144 | A1 * | 2/2016 | McMillan | E05B 47/0002 70/277 |
| 2016/0076278 | A1 * | 3/2016 | Morosawa | E05B 77/18 70/263 |
| 2016/0086400 | A1 * | 3/2016 | Dumas | G07C 9/20 340/5.61 |
| 2016/0098874 | A1 * | 4/2016 | Handville | G07C 9/00309 340/5.61 |
| 2016/0098875 | A1 * | 4/2016 | Zhong | E05B 45/06 70/263 |
| 2016/0104334 | A1 * | 4/2016 | Handville | H04B 5/77 340/5.61 |
| 2016/0358397 | A1 * | 12/2016 | Kristensen | G07C 9/00309 |
| 2018/0351375 | A1 * | 12/2018 | Baldasare | H04W 12/065 |
| 2019/0176036 | A1 * | 6/2019 | Jiang | A63F 13/69 |
| 2019/0371096 | A1 * | 12/2019 | Fisher | G07C 9/00904 |
| 2020/0095804 | A1 * | 3/2020 | Pavlovic | G07C 9/00896 |
| 2020/0288269 | A1 * | 9/2020 | Bartucci | H04L 67/306 |

FOREIGN PATENT DOCUMENTS

| | | | |
|---|---|---|---|
| WO | 2014/137427 | A1 | 9/2014 |
| WO | 2019/230068 | A1 | 12/2019 |

* cited by examiner

LOCK BOX

FIELD OF THE DISCLOSURE

The present disclosure relates to a lock box as well as a method of using a lock box, an apparatus for controlling a lock box and a system comprising the lock box.

BACKGROUND TO THE DISCLOSURE

There are many situations in which it is desirable to reward good behaviour and the completion of activities. For example: parents might wish to reward children for the completion of chores and employers might wish to reward employees for completing tasks at work.

Conventional ways of providing rewards can be unsatisfactory and/or time-consuming.

SUMMARY OF THE DISCLOSURE

According to at least one aspect of the present disclosure, there is described a lock box comprising: a cavity for receiving an item; and a locking mechanism for controlling access to the cavity; wherein the locking mechanism is arranged to allow access to the cavity in dependence on the meeting of a condition set by a controlling party.

Preferably, the lock box comprises a receptacle for receiving a token, wherein the meeting of the condition is associated with the provision of a token to the receptacle.

Preferably, the lock box comprises a user interface and/or a communication interface for receiving the condition from the controlling party.

Preferably, the tokens are associated with, and/or held by, a party, wherein the locking mechanism is arranged to provide access to the cavity for this party upon the meeting of the condition.

Preferably, a processor of the lock box is arranged to determine an association and/or an ownership of a token and/or each token. Preferably, the processor is arranged to determine an association of a token provided to the lock box and/or to the receptacle.

According to another aspect of the present disclosure, there is described a lock box comprising: a cavity for receiving an item; a locking mechanism for controlling access to the cavity; a receptacle for receiving a token; and a user interface and/or a communication interface for receiving a condition from a controlling party; wherein the locking mechanism is arranged to allow access to the cavity in dependence on the meeting of the condition; and wherein meeting of the condition is associated with the provision of a token to the receptacle.

Preferably, the meeting of the condition is associated with the provision of a token to the lock box and/or a/the receptacle of the lock box. Preferably, the meeting of the condition is associated with the provision of one or more of: a number of tokens; a type of token; and a value of tokens.

Preferably, the locking mechanism is arranged so that the condition is alterable by the controlling party.

Preferably, the lock box comprises a communication interface for communicating with a separate computer device.

Preferably, the meeting of the condition is determined based on a transmission received at the communication interface.

Preferably, the lock box comprises a user interface.

Preferably, the lock box is arranged so that the condition is alterable using a/the user interface and/or using a/the communication interface.

Preferably, the user interface and/or a communication interface is arranged to output one or more of: the condition; an indication of progress towards the condition; and a number of tokens earned by a party.

Preferably, the lock box is arranged to require a delay between the provision of each token and/or between the provision of each group of tokens and/or between the provision of each type of token.

Preferably, the lock box is arranged to require a delay between one or more of: the provision of a plurality of tokens; the provision of a plurality of groups of tokens; the provision of a plurality of types of tokens.

Preferably, the lock box is arranged to require a delay between operations of the lock box and/or the locking mechanism. Preferably, the lock box is arranged to require a delay between unlocking operations of the lock box and/or the locking mechanism.

Preferably, the processor is arranged to require a delay between consecutive operations of the locking mechanism.

Preferably, the delay required is one or more of: more than one minute, more than thirty minutes, more than one hour, more than six hours, more than twelve hours, more than twenty-four hours, more than one week, and/or more than one month.

Preferably, the delay required depends on one or more of: a condition associated with tokens being provided; a party associated with tokens being provided; a type and/or value of the tokens; and/or the controlling party.

Preferably, the lock box comprises a processor arranged to identify a token. Preferably, the processor is arranged to identify one or more of: a value of a token; and a type of a token.

Preferably, the meeting of the condition is associated with the provision of one or more of: a number of tokens; a type of token.

Preferably, the processor is arranged to identify a type of each token, wherein the meeting of the condition is associated with the provision of a plurality of different types of tokens, wherein each different type of token is associated with a different type of task.

Preferably, the meeting of the condition is associated with the provision of a plurality of tokens of the same type.

Preferably, the lock box comprises a processor arranged to activate and/or deactivate the locking mechanism in dependence on the meeting of the condition.

Preferably, the condition is dependent on the party, preferably wherein the processor is arranged to determine an appropriate condition for the party.

Preferably, the condition is dependent on one or more of: a previous activity of the party; a previous condition associated with the party; a previous condition having been met by the party; a previous condition not having been met by the party; a time required for a previous condition to have been met by the party; and a change in a characteristic of the party.

Preferably, the condition is associated with and/or dependent on: a time; a party attempting to access the box; an item within the cavity; and a behaviour of a party attempting to access the box.

Preferably, the condition is associated with the performance of tasks.

Preferably, a/the user interface and/or a/the communication interface is arranged to receive from the controlling party one or more of: an approver for a task; a reward for completing a task; and a requirement for a task to be completed.

Preferably, the lock box comprises a receptacle for receiving tokens, preferably a receptacle for receiving physical tokens.

Preferably, the lock box comprises a charging port for charging an item located in the cavity.

Preferably, the charging port is arranged to identify an item being charged.

Preferably, the lock box comprises a sensor arranged to identify the removal of an item from the cavity and/or the insertion of an item into the cavity. Preferably, the sensor is arranged to identify a type and/or identity of the item.

Preferably, the sensor is arranged to identify the time of the removal and/or insertion.

Preferably, the sensor is arranged to compare said time to a target time.

Preferably, the lock box comprises a plurality of cavities.

Preferably, the lock box comprises a plurality of locking mechanisms. Preferably, each locking mechanism is associated with a different condition.

Preferably, the locking mechanism is arranged to provide access to the cavity in dependence on a plurality of conditions. Preferably, the locking mechanism is arranged to provide access to one or more of a plurality of cavities in dependence on the condition that has been met.

According to another aspect of the present disclosure, there is described a lock box comprising: a plurality of cavities for receiving an item; and a locking mechanism for controlling access to the cavities; wherein the locking mechanism is arranged to provide access to the cavities in dependence on a plurality of conditions set by a controlling party; and wherein the locking mechanism is arranged to provide access to each of the plurality of cavities in dependence on the meeting of a corresponding condition.

Preferably, the lock box comprises a user interface for providing an output when an attempt is made to access the cavity and/or when the cavity is accessed and/or when the locking mechanism is operated.

Preferably, the lock box comprises a transparent and/or translucent material so that the contents of the cavity can be viewed from the outside of the lock box.

Preferably, the locking mechanism comprises an electronic locking mechanism, such as a solenoid.

Preferably, the lock box comprises a communication interface for communicating with other computer devices, such as monitoring devices, wherein the communication interface is arranged to receive transmissions from said other devices in relation to the condition.

Preferably, the lock box comprises the lock box is arranged to pair with one or more other computer devices.

Preferably, the lock box comprises an output power supply for providing power to an external device in dependence on a power condition being met and/or in dependence on the condition being met.

Preferably, the lock box is a lock box for children.

According to another aspect of the present disclosure, there is described a lock box comprising: a cavity for receiving an item; a locking mechanism for controlling access to the cavity; and a processor for controlling the locking mechanism so as to allow access to the cavity for a party in dependence on the meeting of a condition set by a controlling party; wherein the meeting of the condition is associated with the provision of a value of tokens that are associated with, and/or held by, the party.

Preferably, the lock box comprises a user interface and/or a communication interface for identifying and/or receiving a token.

Preferably, the lock box comprises comprising a user interface and/or a communication interface for identifying and/or receiving the condition.

Preferably, the processor is arranged to identify an association and/or an ownership of the token.

Preferably, the meeting of the condition is associated with the provision of one or more of: a number of tokens; a type of token; and a value of tokens.

Preferably, the processor is arranged to identify a type of each token, wherein the meeting of the condition is associated with the provision of a plurality of different types of tokens, wherein each different type of token is associated with a different type of task. Preferably, the meeting of the condition is associated with the provision of a plurality of tokens of the same type.

According to another aspect of the present disclosure, there is described an apparatus for controlling the lock box of any preceding claim, the apparatus comprising: a communication interface for setting the condition.

Preferably, the communication interface is arranged to indicate the meeting of the condition to the lock box.

According to another aspect of the present disclosure, there is described a system comprising the aforesaid lock box and the aforesaid apparatus.

Preferably, the system further comprises a monitoring device arranged to communicate with the lock box and/or the apparatus. Preferably, the monitoring device is arranged to transmit a notification indicating a progress of a task and/or a completion of a task.

According to another aspect of the present disclosure, there is described a computer-implemented method of providing access to a lock box, the method comprising: identifying a lock box comprising a cavity for receiving an item; and determining whether a condition set by a controlling party of the lock box has been met; and providing access to the cavity in dependence on the condition having been met.

According to another aspect of the present disclosure, there is described a computer-implemented method of providing access to a lock box, the method comprising: identifying a lock box comprising a cavity for receiving an item; and identifying a condition set by a controlling party of the lock box; determining whether the condition has been met; and providing access to the cavity in dependence on the condition having been met.

According to another aspect of the present disclosure, there is described a computer-implemented method of providing access to a lock box, the method comprising: identifying a lock box comprising a cavity for receiving an item; and identifying a condition set by a controlling party of the lock box, wherein the meeting of the condition is associated with the provision of a value of tokens, wherein the tokens are associated with, and/or held by, a party; determining whether the condition has been met; and providing access to the cavity for the party in dependence on the condition having been met.

Preferably, the method comprises determining an association and/or ownership of the tokens.

Preferably, providing access to the cavity comprises transmitting a notification to the lock box indicating that the condition has been met.

Preferably, the method comprises receiving the condition from the controlling party.

Preferably, the method comprises determining that a task has been completed by a party; and awarding the party a token based on the completion of the task.

Preferably, the meeting of the condition is associated with the provision of a token.

Any feature in one aspect of the disclosure may be applied to other aspects of the invention, in any appropriate combination. In particular, method aspects may be applied to apparatus aspects, and vice versa.

Furthermore, features implemented in hardware may be implemented in software, and vice versa. Any reference to software and hardware features herein should be construed accordingly.

Any apparatus feature as described herein may also be provided as a method feature, and vice versa. As used herein, means plus function features may be expressed alternatively in terms of their corresponding structure, such as a suitably programmed processor and associated memory.

It should also be appreciated that particular combinations of the various features described and defined in any aspects of the disclosure can be implemented and/or supplied and/or used independently.

The disclosure extends to methods and/or apparatus substantially as herein described with reference to the accompanying drawings.

The disclosure will now be described, by way of example, with reference to the accompanying drawings.

DESCRIPTION OF THE PREFERRED EMBODIMENTS

Figure 1A:
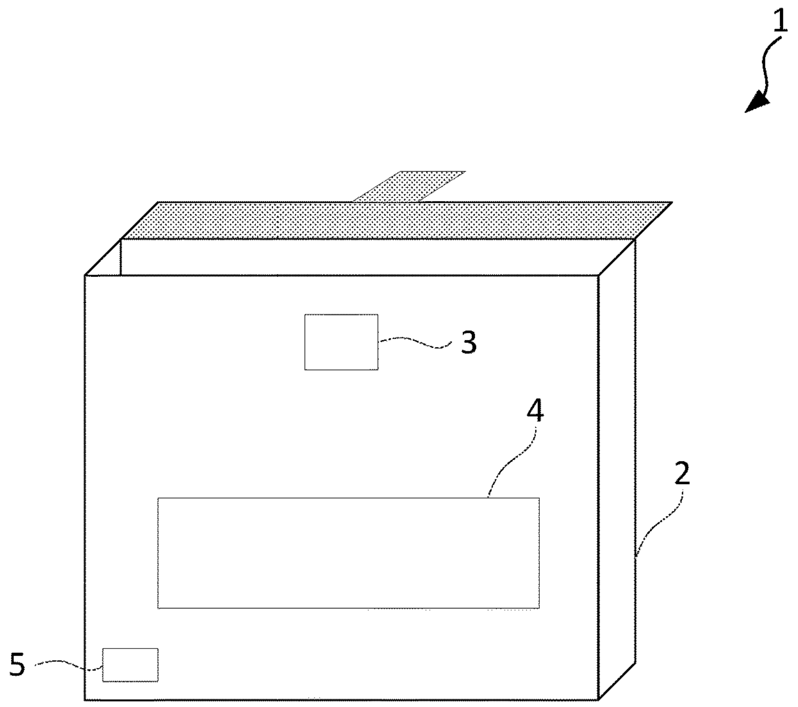
FIGS. 1*a* and 1*b* show embodiments of lock boxes according to the present disclosure.

Referring to FIG. 1*a*, there is shown a lock box 1 that comprises a frame 2. The frame 2 surrounds a cavity of the lock box 1 so that items can be placed within the cavity. The lock box further comprises a locking mechanism 3. The locking mechanism is useable to control access to the cavity. Therefore, items such as a phone or a toy can be placed into the cavity and a child can be prevented from accessing these items for as long as the locking mechanism is active.

In this embodiment, the lock box 1 comprises a lid, where a flap of the lid is arranged to fit into the locking mechanism so that the locking mechanism can secure the lid in place. It will be appreciated that a number of structures are possible that enable access to the cavity to be controlled by the locking mechanism 3.

The lock box 1 of FIG. 1*a* further comprises a screen 4 and a charging port 5. The screen enables information to be shown to users of the lock box, and the charging port enables devices to be charged using the lock box; it will be appreciated that these are optional features.

The lock box 1 typically also comprises a mounting structure (e.g. for mounting the lock box to a wall).

Typically, the cavity is arranged to hold electronic items. The lock box charging port 5 may be internal to the cavity and may be arranged to supply power to items located in the cavity. Therefore, items can be charged while they are locked in the lock box 1.

The lock box 1 typically comprises a communication interface for communicating with another electronic device, such as a phone. This other electronic device is typically able to control the locking mechanism 3; for example, the other electronic device may be able to activate or deactivate the locking mechanism. Similarly, the other electronic device may be able to set conditions for the activation and deactivation of the locking mechanism (e.g. set a time at which the locking mechanism will be deactivated and/or set requirements that must be met for the locking mechanism to be deactivated). The locking mechanism may also be controlled using a user interface on the lock box, such as the screen 4, where a user may be able to deactivate the locking mechanism and/or set conditions for the deactivation of the locking mechanism by operating the user interface. In order to prevent another party changing these conditions, the user interface and/or the lock box typically requires authentication before use (e.g. the entry of a passcode) so that only certain parties are able to control the locking mechanism.

Figure 1B:
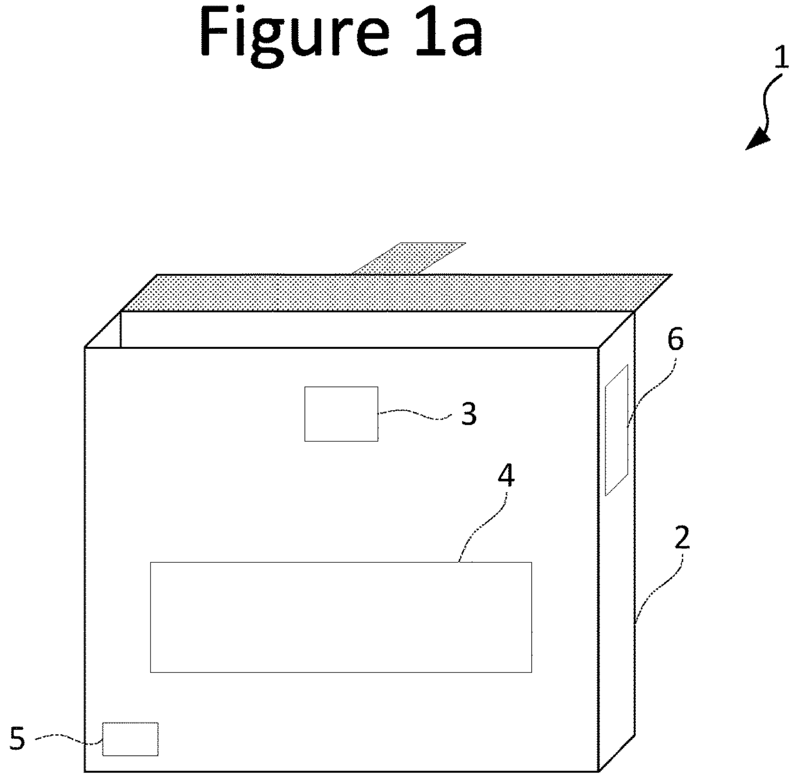

Referring to FIG. 1*b*, there is shown another embodiment of the lock box 1. The embodiment of the lock box shown in FIG. 1*b* comprises a receptacle 6 for receiving tokens.

In some embodiments, the locking mechanism 3 is arranged to operate in dependence on the receipt of tokens (e.g. physical tokens). In particular, the locking mechanism may be arranged to allow access to the cavity when a certain number of tokens and/or a certain type of tokens are inserted. As will be described in more detail later on, a party controlling the lock box is typically able to set conditions for deactivating the locking mechanism, such as "insert 3 tokens" or "insert 1 red token and 1 blue token". This enables the controlling party to award tokens to another party in return for desirable behaviour so that once this other have obtained enough tokens they are able to operate the locking mechanism and to access the cavity.

In a practical example, the controlling party is a parent and the other party is a child. The parent is then able to incentivise the child to perform chores etc. by offering the child tokens. Other users are of course possible; for example, the controlling party may be an employer with the other party being an employee. With this example, the employee may be rewarded with tokens for performing exemplary work. The design of the lock box, and the rewards kept in the lock box, typically depends on the use of the lock box so that when the lock box is used with children it might be decorated with bright colours and cartoons and the item located within the lock box may be an electronic device that the child is only allowed to use when they have completed certain chores. Where the lock box is used for employees, it might be decorated with more subdued colours, and it might contain a monetary reward or a number of desirable items that an employee can select as their reward.

By enabling the child to open the lock box themselves, the child is able to receive a sense of achievement (since the child is unlocking their own reward as opposed to being handed a reward). Furthermore, the lock box 1 can be used to teach a child responsibility and control, since the child is able to decide whether to use tokens sparingly to obtain regular regards or whether to use tokens in bursts to access rewards one after the other.

Typically, the frame 2 comprises a see-through material so that users are able to see into the lock box. This enables the child to determine their reward before they have collected enough tokens to unlock the lock box.

While the embodiment of FIG. 1*b* comprises a receptacle 6 for receiving physical tokens in order to deactivate the locking mechanism 3, it will be appreciated that a similar system is possible using digital tokens (or 'points'). In particular, the lock box may be associated with an application on a smartphone where the parent and the child each have access to this application. The parent is then able to award digital tokens to the child in response to the completion of tasks and the child is able to deactivate the locking mechanism 3 using the application once sufficient tokens have been collected. References in this document to tokens should be understood to cover both physical tokens and digital tokens, or digital points (and references to points should similarly be understood to cover physical tokens and digital tokens). For example, where this disclosure refers to a certain number of tokens being required to access the cavity, this should be understood to also cover embodiments where a certain number of points are required to access the cavity.

The embodiments of FIGS. 1*a* and 1*b* have shown a lock box with a single cavity and a single locking mechanism. In practice, the lock box may comprise a plurality of cavities and/or a plurality of locking mechanisms (where a single cavity may be locked by a plurality of locking mechanisms and/or a single locking mechanism may control access to a plurality of cavities). Each cavity may then be unlocked by a different number of points or type of points, so that a child may be able to unlock cheaply a first cavity to receive a small reward and/or a child may be able to save up their points to unlock a second cavity to receive a large reward.

Figure 2:
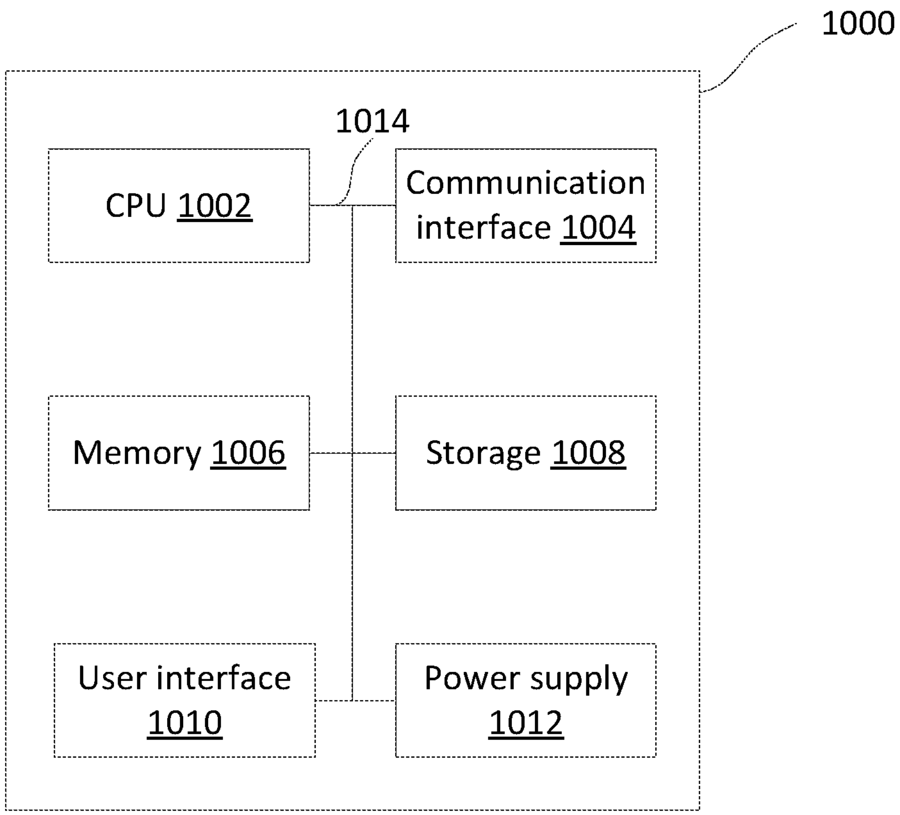
FIG. 2 illustrates a computer device that is used to implement aspects of the lock box.

Referring to FIG. 2, the methods and apparatuses disclosed herein are typically implemented on a computer device 1000. In particular, the lock box 1 typically comprises a computer device. Furthermore, various aspects of the methods disclosed herein may be implemented on computer devices, such as the smartphones or personal computers of the various parties.

The (or each) computer device 1000 comprises a processor in the form of a CPU 1002, a communication interface 1004, a memory 1006, storage 1008, a user interface 1010, and a power supply 1012 coupled to one another by a bus 1014.

The CPU 1002 (or processor) executes instructions, including instructions stored in the memory 1006 and/or the storage 1008.

The communication interface 1004 is typically an Ethernet network adaptor coupling the bus 1012 to an Ethernet socket. The Ethernet socket is coupled to a network, such as the Internet. It will be appreciated that any communication medium may be used by the communication interface, such as area networks (e.g. the Internet), infrared communication, and Bluetooth®.

Typically, the communication interface 1004 of the lock box 1 is arranged to interact with the communication interface of another communication device in order to receive instructions, e.g. in order to determine a condition for the operation of the locking mechanism.

The memory 1006 stores instructions and other information for use by the CPU 1002. The memory is the main memory of the computer device 1000. It usually comprises both Random Access Memory (RAM) and Read Only Memory (ROM).

The storage 1008 provides mass storage for the computer device 1000. In different implementations, the storage is an integral storage device in the form of a hard disk device, a flash memory or some other similar solid state memory device, or an array of such devices.

The user interface 1010 enables users to interact with the computer device 1000. For the lock box 1, the user interface typically comprises the locking mechanism 3 and/or the screen 4. The screen may be a touch sensitive screen so that users can view information and also input information. In particular in embodiments without the screen 4, the operation of the lock box may be controllable by another computer device.

The locking mechanism 3 typically comprises an electronic locking mechanism that is arranged to be controlled by the computer device 1000 (e.g. the CPU 1002) of the lock box 1. For example, the locking mechanism may comprise a solenoid. This locking mechanism may then be activated and deactivated remotely and/or activated and deactivated based on conditional logic statements executed by the CPU 1002.

The power supply 1012 provides power to the other components of the computer device 1000. The power supply may comprise one or more of: a connection to mains power (e.g. a plug), a portable power supply, a battery, and a rechargeable battery. A portable power supply may be used to implement a portable lock box. In some embodiments, the lock box comprises both a mains power supply and a portable power supply; this enables the lock box to be plugged into the mains supply during normal use and then used as a portable lock box occasionally.

In some embodiments, the lock box 1 comprises a sensor for determining that an item has been placed into a cavity and/or for checking an item located in a cavity (e.g. the lock box may comprise a camera or an infrared sensor). The lock box may also comprise sensors for interacting with the external environment, e.g. the lock box may comprise a sensor for checking whether a child (or a person) is present in a room, for checking whether a person is in a bed or is asleep, or for checking whether a light is on (e.g. the lock box may comprise a noise sensor or a light sensor). These exemplary sensors may be used to award points to a child who adheres to a bed time.

A computer program product is provided that includes instructions for carrying out aspects of the method(s) described below. The computer program product is stored, at different stages, in any one of the memory 1006, the storage 1008 and/or a removable storage (e.g. a universal serial bus storage device). The storage of the computer program product is non-transitory, except when instructions included in the computer program product are being executed by the CPU 1002, in which case the instructions are sometimes stored temporarily in the CPU or memory. It should also be noted that the removable storage is removable from the computer device 1000, such that the computer program product may be held separately from the computer device from time to time. Different computer program products, or different aspects of a single overall computer program product, are present on the computer devices used by any of the users.

The lock box 1 may also be arranged to communicate with, and in particular receive transmissions from, other computer devices in order to evaluate the performance of tasks. For example, the lock box may be arranged to communicate with a smart watch to determine that the user has performed exercise, and/or the lock box may be arranged to interact with a personal computer to determine an amount of time for which the personal computer has been used (and/or to determine a use of the personal computer). This enables automation of the collection of points so that the amount of supervision required by the parent is minimised. This is useful both to save time for the parent and to give the child a feeling of independence.

In this regard, parties in the system may be provided with monitoring computer devices (e.g. smart watches or cameras) that are useable to verify the completion of tasks. There may be provided a system comprising the lock box 1 and one or more such monitoring computer devices. The lock box may be arranged to communicate with these monitoring computer devices in order to determine the completion of a task, the meeting of a condition, and/or the collection of a certain number of points. Equally, these monitoring computer devices may be arranged to communicate with a further computer device (e.g. a server), where the further computer device is arranged to award a token to a child in dependence on a transmission from a corresponding monitoring computer device.

The monitoring device may comprise a sensor, such as a GPS sensor, and may also comprise an output means, such as a display, a speaker and/or a communication device. The output means may be arranged to operate in dependence on the condition. For example, the output means may comprise a communication interface for making calls, where a child is only able to use this communication interface if the condition is met.

Typically, the monitoring device is arranged to interact with a further device in order to collect tokens. For example, the monitoring device may comprise a watch and the further device may comprise a wand. This may enable a parent to give their child the watch and to then tap the watch in order to provide a token to the child. This method enables a mechanism for providing a reward that is tangible (e.g. because it involves the use of a wand) as well as portable.

Another example of a monitoring device is a smart toothbrush, where such a toothbrush may be arranged to determine that a child has brushed their teeth, and/or has brushed their teeth for a certain period and/or at a certain time, and to provide a token in dependence on such action having been taken.

Figure 3:
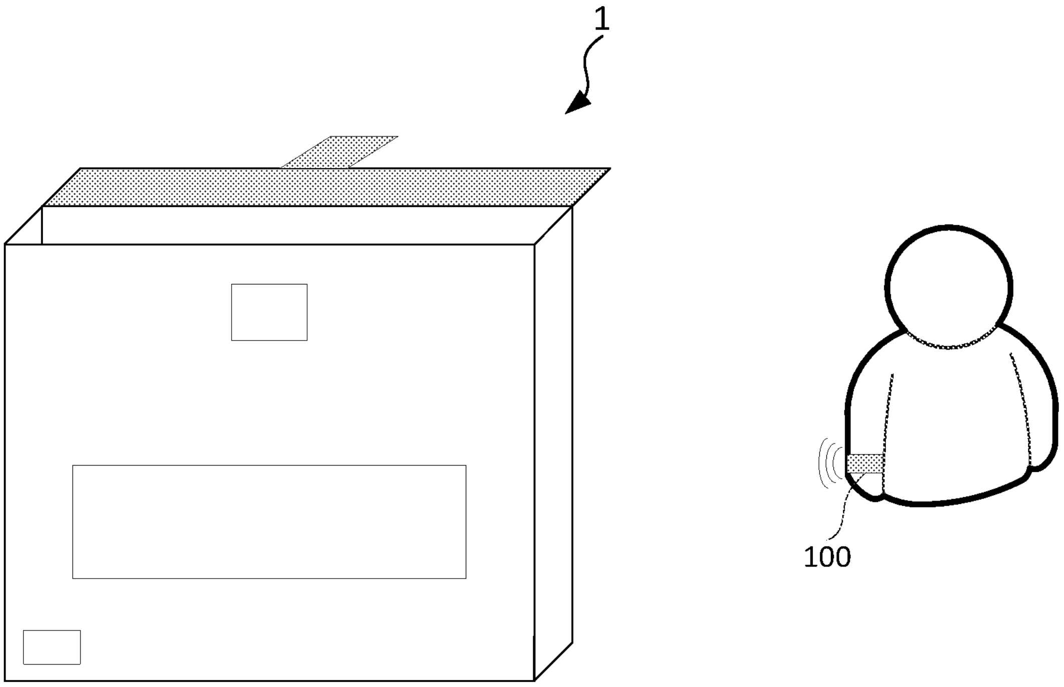
FIG. 3 shows a system comprising a lock box and a monitoring device.

An exemplary system comprising the lock box 1 and a monitoring device 100 is shown in FIG. 3. While this system shows a monitoring device that comprises a smart watch, it will be appreciated that a range of monitoring devices are useable alongside and/or instead of a smartwatch.

The monitoring device may be provided alongside the lock box 1 (e.g. in a kit of parts along with the lock box) and may be arranged to be paired with the lock box.

Figure 4:
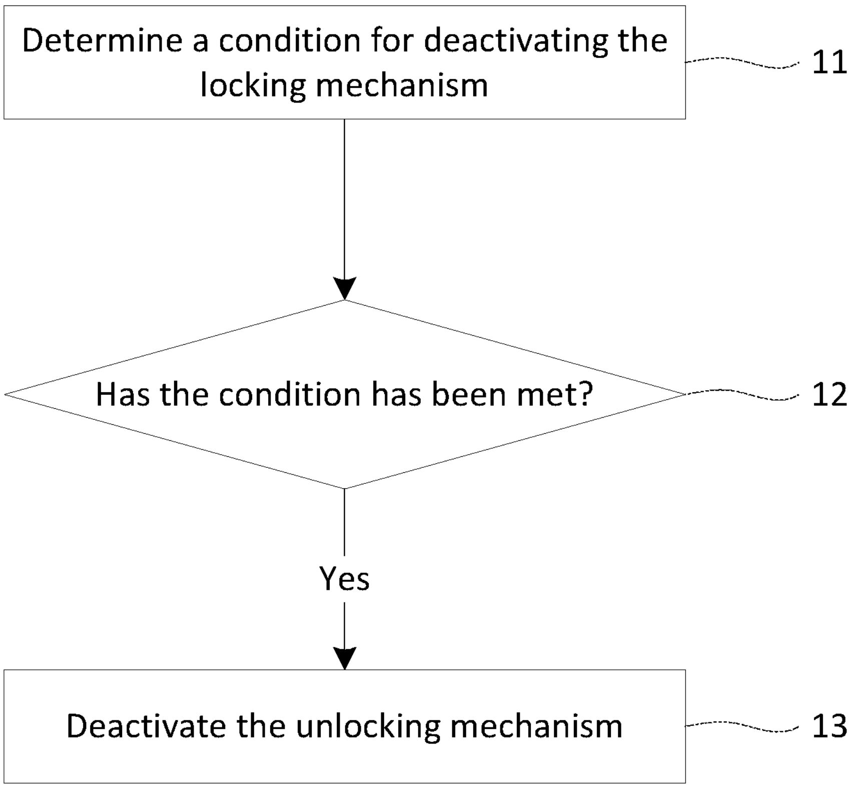
FIG. 4 shows a method of operating the lock box.

Referring to FIG. 4, there is described a method of operating the lock box 1, and in particular a method of unlocking the lock box. This method is typically carried out by the computer device 1000 of the lock box.

In a first step 11, the computer device 1000 determines a condition for deactivating the locking mechanism 3.

Typically, this condition is set by a party controlling the lock box (e.g. a parent). The parent may set the condition using the user interface 1010 and/or using the communication interface 1004 of the computer device 1000 of the lock box 1. Typically, the condition is set via an application on another computer device, such as a smartphone of the parent. This enables the unlocking condition to be set easily and to be changed easily. This can be useful, for example, if a child is misbehaving; in this situation the controlling party may implement (or threaten to implement) a stricter condition without the need to be in the proximity of the lock box.

In a second step 12, the computer device 1000 determines whether the condition has been met. For example, a child may collect a number of tokens for each task that they perform and the computer device may compare the number of tokens collected to a threshold value.

In a third step 13, if the condition has been met, the computer device 1000 deactivates the locking mechanism 3 to provide access to the cavity.

If in the second step 12 the computer device 1000 determines that the condition has not been met, then the computer device 1000 may return to the first step 11 of the method.

Typically, the method is initiated by an action, such as the child completing a task and being awarded tokens, or the child attempting to unlock the lock box 1. Therefore, if the condition has not been met, the method may simply end.

Determining that the condition has been met may comprise one or more of: identifying a number and/or type of tokens that have been earned (e.g. based on these tokens being inserted into the receptacle 6); receiving a transmission from the monitoring device 100; and receiving a transmission from a separate computer device associated with a controlling entity.

As has been described with reference to FIG. 1*b*, the lock box 1 is typically arranged to receive (physical) tokens. The method of FIG. 4 may then be initiated by the lock box identifying that a token has been placed into the receptacle 6, where the second step 12 of the method comprises determining whether a sufficient number and/or a certain type of tokens has been provided.

The condition typically relates to one or more of:

A certain number of tokens and/or points being earned. Each task may be associated with a certain number of tokens so that, for example, completing homework may earn more tokens than washing the dishes. Unlocking the lock box 1 may then require a certain number of tokens to be collected. These tokens may automatically be used (so that the child cannot save up tokens), or the use of the tokens may be dependent on the child so that the child is able to save up tokens. This could enable the child to save up tokens for a few weeks so that they are able to unlock the lock box a number of consecutive times or so that they can simultaneously unlock a number of different cavities of the lock box.

A time. For example, the lock box 1 may be unlockable only after 7 pm and/or only between 7 pm and 9 pm.

The completion of a specific task and/or a specific type of task and/or the provision of a certain type and/or certain types of tokens. Tasks may be sorted into types, where a child is required to complete a certain type of task and/or a plurality of different types of tasks to unlock the lock box 1. Exemplary types of tasks include learning tasks (e.g. doing homework or reading a book), chores (e.g. washing up dishes or cleaning toilets), sporting tasks (e.g. playing a sport, or doing a certain amount of exercise), and achievements (e.g. getting an 'A' grade at school or winning a competition). Where tokens are used, a child may be provided with different types of tokens depending on the task that is completed; for example, the child may receive a green token for learning tasks and a blue token for chores. In order to unlock the lock box, the child may be required to provide three tokens, at least one of which is green.

In practice, the condition may comprise a plurality of sub-conditions, so the child may be able to unlock the lock box 1 only during a certain time, when a certain number of token have been collected, and when specific types of tasks have been performed.

Furthermore, the condition may comprise a plurality of alternative conditions, for example the child may be required to either collect a certain number of points or to complete a certain task, where the child is then able to choose which of these conditions to meet.

The operation of the locking mechanism 3 may be dependent on a plurality of conditions, where meeting each condition may unlock a different cavity of the lock box 1, may deactivate a different locking mechanism, and/or may operate a different aspect of the box. For example, meeting a first condition may unlock a first cavity in the box and meeting a second condition may unlock a second cavity of the box (or unlock both the first and second cavity). This can be used to set easy and hard conditions, where meeting harder conditions results in a bigger reward. In practice, there may be daily tasks, weekly tasks, and monthly tasks, where completing the monthly tasks obtains a larger (but less regular) reward. An arrangement with a plurality of cavities can also be used to increase user friendliness, since different items can be placed in different cavities of the lock box where these cavities become accessible at different times and/or after different actions. For example, a football may be placed in a first cavity and a tablet may be placed in a second cavity, where the first cavity can only be unlocked after homework has been completed and the second cavity can only be unlocked after homework has been completed and when it is later than 7 pm. This avoids the parent needing to continually restock the lock box.

The conditions may be associated with an interaction with the lock box 1 and/or with a cavity of the lock box. Similarly points may be awarded for interactions with the lock box. Continuing with the football and tablet example, a requirement for unlocking the second cavity may be that the football is returned to the first cavity. Checking that an item has been placed in a cavity may require confirmation from the child or the parent (or another overseer). Equally, the lock box may comprise a sensor for determining that an item has been placed into a cavity and/or for determining a type and/or identity of an item located in a cavity (e.g. the lock box may comprise a camera or an infrared sensor).

In particular, the computer device of the lock box may be arranged to identify an electronic item located in the lock box and/or to identify an item connected to the charging port of the lock box. This may comprise the use of the communication interface 1004, where Bluetooth® or Near Field Communication (NFC) protocols may be used to identify an item placed into the lock box. Similarly, the CPU 1002 may identify an item plugged into a charger. This provides a way to identify that the child has returned an electronic item to the lock box—and a child may be rewarded with tokens for returning an item in this way after an authorised period of use.

Typically, the user interface 1010 (e.g. the screen 4) of the lock box 1 and/or the user interface of another device is arranged to show the conditions required for unlocking and to show progress towards these conditions. The user interface may also show a list of tasks and the rewards available for completing these tasks. The child is then able to determine which tasks they need to complete to unlock the lock box.

The controlling entity, e.g. the parent is able to set tasks (and rewards) and to set conditions. This enables the parent to incentivise certain tasks; for example, the reward for doing revision may be increased as exams approach. This also enables parents to alter conditions based on external factors; for example, misbehaviour may result in the parent increasing the number of tokens needed to access the cavity. The parent may also be able to add and/or remove achievements for the child. For example, the child may be awarded a certain number of tokens for doing chores and the parent may be able to change this award later on if the chore is found to be done particularly well or particularly poorly—this alteration may comprise altering a digital token and/or altering the way in which the lock box responds to a physical token (e.g. the lock box may be instructed to only give half credit for a certain type of token).

The parent is typically also able to alter the behaviour of the lock box 1. For example, the parent may be able to change a notification that occurs: when a condition has been met, when the child attempts to unlock the lock box and/or when the lock box is unlocked.

In some embodiments, the lock box 1 is arranged to require a delay between the receipt of different tokens, different sets of tokens, and/or different types of tokens. This delay may be set by the parent. In a practical example, the child may earn two tokens for doing the washing up and may place these into the receptacle; the child may then earn a token for doing homework, but the lock box may be arranged so that this token cannot be placed into the receptacle for a certain period of time. This can be used to prevent the child from rushing through chores (and doing them poorly) to earn tokens more rapidly and can also be used to prevent the child from saving up tokens to unlock the lock box over and over (for example, avoid time limits placed on the use of electronic devices).

The tokens may be automatically provided to the lock box 1 when earned (e.g. where the lock box continually monitors an account associated with the child) so that the delay may relate to a delay between the earning of tokens where a child is only able to earn a certain amount of tokens in a given time period. Equally, the tokens may be provided to the lock box by the child, so that a child may be able to acquire a large number of tokens but may only be able provide a certain number of these tokens to the lock box in a given time period (e.g. so that a child cannot unlock the lock box multiple times in quick succession).

Similarly, the lock box 1 may be arranged to require a delay between the meeting of conditions and/or unlockings of the lock box so that the child is not able to unlock the box multiple times in quick succession.

The delay required (e.g. between the receipt of tokens, the meeting of conditions, and/or the unlocking of the box) may be more than one minute, more than thirty minutes, more than one hour, more than six hours, more than twelve hours, more than twenty-four hours, more than one week, and/or more than one month. The delay may depend on a condition that is being met. For example, the meeting of a first condition that enables a child to obtain a valuable reward (e.g. a new video game) may only be possible each month; the meeting of a second condition that enables a child to obtain a relatively low value reward (e.g. a bar of chocolate) may be possible once every twenty-four hours.

Similarly, the delay required may be determined based on a party attempting to unlock the lock box and/or based on the controlling entity of the lock box (e.g. a parent may determine how often each child is able to open the lock box).

In some embodiments, the lock box 1 comprises an output power supply for providing power to an external device. For example, the output power supply may be arranged to provide power to a games console. The lock box may be arranged to provide power to the output power supply in dependence on a condition being met. This provision of power may be for a certain period of time, where this period of time may be set by the parent and/or where this period of time may be dependent on the condition that has been met. This enables the child to be rewarded for good behaviour with access to an electronic device.

The output power supply may be internal to the lock box 1 (e.g. located in the cavity) to prevent the child from removing a plug from the output power supply. For example, the output power supply may be inside a locked compartment, where the compartment comprises a gap that allows a lead to pass through the compartment but prevents the passage of a plug.

The lock box 1, and/or an application associated with the lock box, may be arranged to store historic information, e.g. relating to the tasks completed by the child. The child and/or the controlling party may then be able to view this information using the user interface 1010 (e.g. the screen 6) of the lock box.

Also disclosed herein is an application that is useable to control operate the lock box 1 and to view information associated with the lock box. This application is typically provided in two parts: a parent application that can be accessed by the party controlling the lock box (e.g. by inputting a password) and a child application that is accessible by the party attempting to access the lock box. The application (or one of the applications) may be downloaded to a smart phone, a smart watch, and/or another smart device.

The controlling application is arranged to communicate with the lock box 1 and/or the child application in order to:

- Set tasks and specify rewards.
- Set an approver and/or overseer for tasks. In this regard, tasks typically require approval to confirm that they have been completed; for example, if the child is tasked to tidy their room a parent might need to inspect the room before the child is awarded points. The parent might trust the child to self-certify for certain tasks. This can also be used to teach responsibility to a child so that a child may be set as an approver for a certain task as a reward for good performance of this task—and then this self-approval ability may be removed if the child thereafter decreases the quality of their performance of the task.
- Set the condition(s) for unlocking the lock box 1.
- Set an output for a condition having been met and/or a task having been completed (e.g. the lock box 1 may light up and/or make a sound when an unlocking condition has been met).
- Access a task history and/or an achievement history.
- Provide feedback to the child application (e.g. provide feedback if a task is done poorly so that this feedback can be referenced when the task is next performed).
- Pair a monitoring device 100 to the lock box 1.

The child application is typically arranged to communicate with the lock box 1 and/or the parent application in order to:

- View tasks and rewards.
- View approver(s) for tasks.
- View the condition(s) for unlocking the lock box 1.
- View the progress towards conditions (e.g. view a current number of points).
- Access a task history and/or an achievement history.
- Access feedback.

In some embodiments, the condition(s) required for a party to unlock the lock box 1 is dependent on that party, e.g. on a characteristic of that party and/or a history of that party. For example, when a child has regularly met a condition required to unlock a lock box, a processor of the lock box may be arranged to update the condition to make it more difficult (e.g. to increase a value of tokens required to unlock the locking mechanism at a future time). Equally, where a child has not managed to meet a condition for an extended period of time, the processor may be arranged to simplify the condition (e.g. to decrease the value of tokens required to unlock the locking mechanism) so as to encourage the child to continue earning tokens.

In various embodiments, a processor (e.g. of the lock box 1 or of a separate computer device) is arranged to determine an appropriate condition for a party based on one or more of: previous conditions that have been met by the party; previous conditions that have not been met by the party; a time required to meet a previous condition; a characteristic of the party and/or a change in a characteristic of the party, such as an age (where conditions may become harder as a child ages); a knowledge of the party; and a behaviour of the party.

By enabling the processor to determine an appropriate unlocking condition for a party, a controlling entity is able to set an initial unlocking condition for that party and to thereafter allow an appropriate condition to be determined by the processor. This enables the efficient personalisation of unlocking conditions.

The determination of an appropriate unlocking condition may depend on artificial intelligence and/or machine learning algorithms.

Alternatives and Modifications

It will be understood that the present invention has been described above purely by way of example, and modifications of detail can be made within the scope of the invention.

For example, the lock box 1 may comprise one or more of: a sleep timer, an alarm, and a night-light. These features may be linked to the unlocking of the lock box; for example, a child may receive points for going to bed early and for getting up soon after an alarm, where this can be determined by sensors in the lock box. In some embodiments, the lock box comprises a snooze function associated with the alarm, where the child is able to snooze the alarm at the cost, or opportunity cost, of points.

In some embodiments, the lock box 1 comprises speakers. These speakers (or the screen 4) may output a notification when a condition has been met. This can be used to congratulate the child and also provides a way to notify the child that they can deactivate the unlocking mechanism 3. More broadly, the user interface and/or the communication interface may output a notification when a condition has been met.

While the detailed description has primarily described the invention in the context of a lock box 1 for a child that is controlled by a parent, it will be appreciated that the disclosure extends beyond this context. For example, the lock box 1 may be controlled by an employer and used to reward employees or the lock box may be controlled by a corporation and used to reward certain behaviours (e.g. tokens for use with the lock box may be provided for recycling).

Reference numerals appearing in the claims are by way of illustration only and shall have no limiting effect on the scope of the claims.

The invention claimed is:

1. A lock box comprising:

a cavity for receiving an item;

a locking mechanism for controlling access to the cavity; and a processor for controlling the locking mechanism so as to allow access to the cavity for a first party in dependence on the meeting of a condition set by a controlling party;

wherein the meeting of the condition is associated with the provision of a value of tokens that are associated with, and/or held by, the first party; wherein the lock box is arranged to receive tokens from the first party; and wherein the lock box is arranged to require a delay between one or more of:

the provision of a plurality of tokens;

the provision of a plurality of groups of tokens;

the provision of a plurality of types of tokens.

2. The lock box of claim 1, wherein the processor is arranged to require a delay between consecutive operations of the locking mechanism.

3. The lock box of claim 1, wherein the delay required is one or more of: more than one minute, more than one hour, and/or more than twenty-four hours.

4. The lock box of claim 1, wherein the delay required depends on one or more of:

the condition;

the first;

a type and/or value of the tokens; and the controlling party.

5. The lock box of claim 1, wherein the lock box comprises a receptacle for receiving a token; and wherein the meeting of the condition is associated with the provision of a token to the receptacle.

6. The lock box of claim 1, wherein;

the tokens comprise digital tokens; and/or the lock box comprises a user interface and/or a communication interface for identifying and/or receiving a token; and/or the processor is arranged to identify an association and/or an ownership of the token.

7. The lock box of claim 1, comprising a user interface and/or a communication interface for identifying and/or receiving the condition.

8. The lock box of claim 1, wherein the meeting of the condition is associated with one or more of;

the provision of one or more of: a number of tokens; a type of token; and a value of tokens; and the performance of one or more tasks.

9. The lock box of claim 1, wherein the processor is arranged to identify a type and/or value of each token, wherein the meeting of the condition is associated with one or more of:

the provision of a plurality of different types of tokens, wherein each different type of token is associated with a different type of task; and the provision of a predetermined value of tokens; and wherein the lock box is arranged to communicate with a further computer device to verify the completion of tasks.

10. The lock box of claim 1, wherein a user interface and/or a communication interface is arranged to receive from the controlling party one or more of:

an approver for a task;

a reward for completing a task; and a requirement for a task to be completed.

11. The lock box of claim 1, comprising one or more of;

a plurality of cavities;

a plurality of locking mechanisms, wherein each locking mechanism is associated with a different condition.

12. The lock box of claim 1, wherein the condition is dependent on the first party.

13. The lock box of claim 12, wherein the condition is dependent on one or more of:

a previous activity of the first party;

a previous condition associated with the first party;

a previous condition having been met by the first party;

a previous condition not having been met by the first party;

a time required for a previous condition to have been met by the first party; and a change in a characteristic of the first party.

14. The lock box of claim 1, wherein a user interface and/or a communication interface is arranged to output one or more of:

the condition;

an indication of progress towards the condition; and a number of tokens earned by the first party.

15. The lock box of claim 1, wherein the condition is associated with and/or dependent on:

a time;

an item within the cavity; and a behaviour of the first party that is attempting to access the box.

16. The lock box of claim 1, comprising one or more of:

a charging port for charging an item located in the cavity;

a user interface for providing an output when an attempt is made to access the cavity and/or when the cavity is accessed and/or when the locking mechanism is operated;

a communication interface for communicating with other computer devices, wherein the communication interface is arranged to receive transmissions from said other devices in relation to the condition; and an output power supply for providing power to an external device in dependence on a power condition being met and/or in dependence on the condition being met.

17. An apparatus for controlling the lock box of claim 1, the apparatus comprising a communication interface for setting the condition.

18. The apparatus of claim 17, wherein the communication interface is arranged to indicate the meeting of the condition to the lock box.

19. The lock box of claim 1, wherein the tokens are associated with the first party and the value of tokens required to meet the condition is dependent on the first party.

20. A computer-implemented method of providing access to a lock box, the method comprising:

identifying a lock box comprising a cavity for receiving an item; and identifying a condition set by a controlling party of the lock box, wherein the meeting of the condition is associated with the provision of a value of tokens, wherein the tokens are associated with, and/or held by, a first party;

receiving tokens from the first party;

determining, based on the tokens, whether the condition has been met; and providing access to the cavity for the first party in dependence on the condition having been met;

wherein the lock box is arranged to require a delay between one or more of:

the provision of a plurality of tokens;

the provision of a plurality of groups of tokens;

the provision of a plurality of types of tokens.

* * * * *